W. H. BRISTOL.
HYGROMETER.
APPLICATION FILED NOV. 22, 1913.
1,162,446.
Patented Nov. 30, 1915.
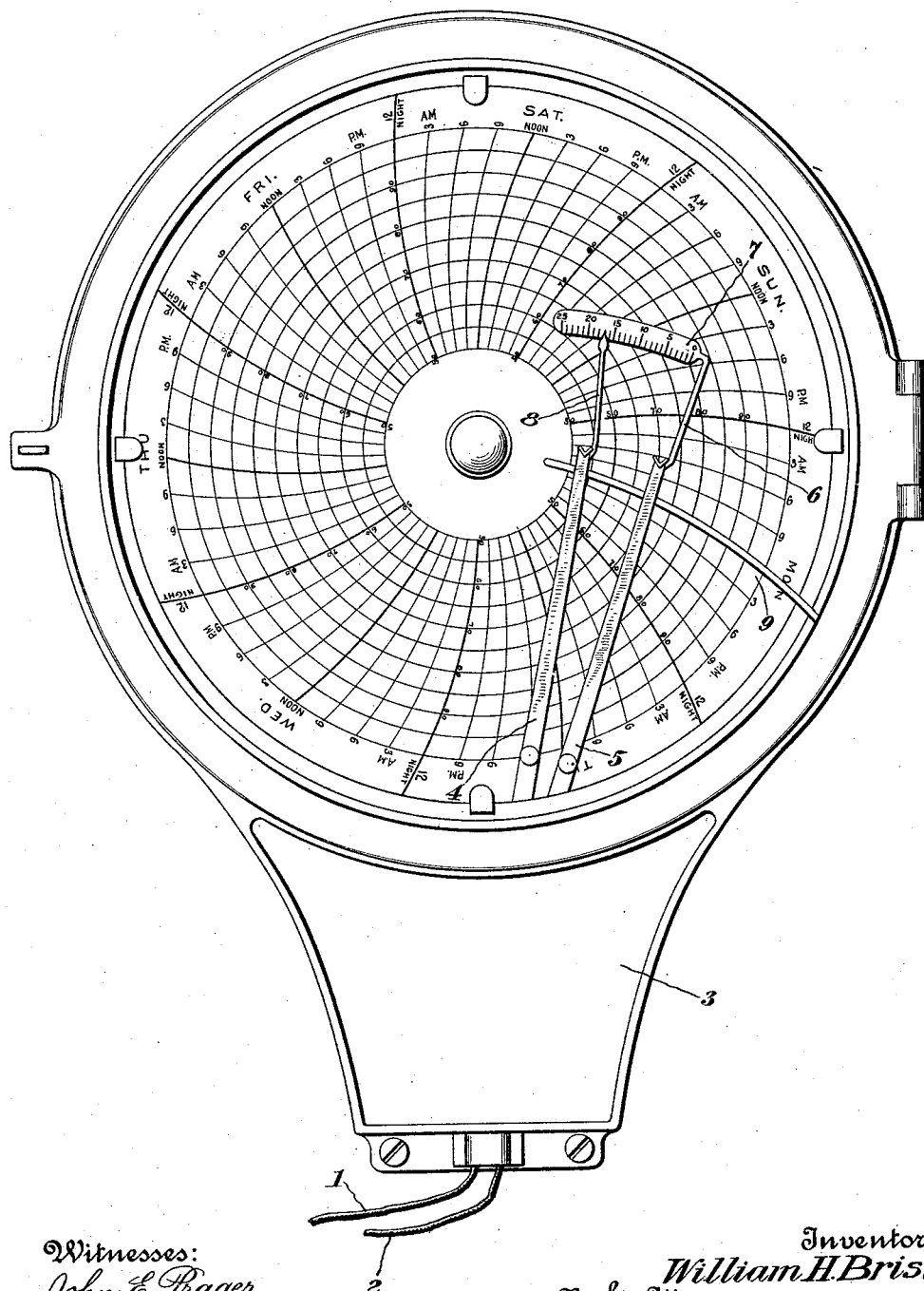
Witnesses:
John E. Prager
A. Worden Gibbs
Inventor
William H. Bristol
By his Attorney
Fredk. F. Schuetz.

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

HYGROMETER.

1,162,446.   Specification of Letters Patent.   Patented Nov. 30, 1915.

Application filed November 22, 1913. Serial No. 802,383.

*To all whom it may concern:*

Be it known that I, WILLIAM H. BRISTOL, a citizen of the United States, and a resident of Waterbury, in the county of New Haven and State of Connecticut, have invented certain new and useful Improvements in Hygrometers, of which the following is a specification.

The invention relates to hygrometers, more particularly of the wet and dry bulb type in which the determination of relative humidity is made by measuring the difference in the indications afforded by two thermometric devices, one of which is exposed to the actual atmospheric temperature and the other to the evaporation of water in said atmosphere.

It has for its object to provide, in connection with the temperature measuring members of such apparatus, means for more readily and accurately determining the actual temperature differences; and to this end, consists in providing one of the members with a suitably graduated scale of differences and the other with a pointer coöperating therewith.

The nature of the invention will be best understood when described in connection with the accompanying drawing which illustrates, in elevation, a recording gage for measuring a plurality of temperatures and provided with the aforesaid attachments.

Referring to the drawing, 1 and 2 designate, for example, capillary tubes extending respectively from the wet and dry bulb thermometric devices (not shown) and which devices through the expansion and contraction of an expansible fluid affect suitable mechanism of the gage 3, as is well understood and forms no part of the present invention. Gage 3 is provided with two measuring arms 4 and 5, the former operated by variations of the temperature of the so-called "wet bulb" and the latter by the variations of the atmospheric temperature. According to the usual practice, readings are taken of the temperature indications afforded by these two arms, and that of the arm 4 then subtracted from that of the arm 5 and the difference thus found used to determine the relative humidity by reference to a suitable table. This feature of subtracting one temperature reading from the other is not only troublesome but provides a source of error.

To obviate the aforesaid difficulties, there is attached to the arm 5, for example by means of an extension piece 6, a small scale piece 7 which is suitably graduated in a direction toward the arm 4 so as to correspond to actual differences between the positions of the respective arms. The arm 4 is provided with an extension or pointer 8 adapted to coöperate with the scale 7, the divisions of which are widened over those of the actual dial 9 of the gage 3 to conform to the greater radius. This widening of the divisions of scale 7, moreover, enables the differences of temperature to be more accurately read. It will be understood that with the provision herein described it will be necessary only to take the reading of the arm 5 and of the pointer 8 and then refer these readings to a suitable table to make a humidity determination. Subtraction of readings is thereby obviated.

I claim:—

In a recording hygrometer of the wet and dry bulb type: two independently actuated measuring arms for the respective temperatures, and suitable marking members carried by said arms; a record sheet provided with a suitable scale and upon which the said marking members are adapted to effect a record; a scale to indicate differences of temperature, carried by the arm measuring the atmospheric temperature, located beyond its corresponding marking point and graduated toward the other of said arms; and a pointer carried by the other arm and extending beyond its corresponding marking point to coöperate with said scale of differences.

Signed at New York, in the county of New York, and State of New York, this 18th day of November, A. D. 1913.

WILLIAM H. BRISTOL.

Witnesses:
  FRED'K F. SCHUETZ,
  LAURA E. SMITH.

Copies of this patent may be obtained for five cents each, by addressing the "Commissioner of Patents, Washington, D. C."